(12) United States Patent
Saville et al.

(10) Patent No.: US 7,954,998 B2
(45) Date of Patent: *Jun. 7, 2011

(54) THRUST BEARING

(75) Inventors: Marshall Saville, Torrance, CA (US);
Keith A Hurley, Garden Grove, CA (US); Aileen Mah, Redondo Beach, CA (US); Sun Goo Alan Kang, Los Angeles, CA (US)

(73) Assignee: Honeywell International, Inc., Morristown, NJ (US)

( * ) Notice: Subject to any disclaimer, the term of this patent is extended or adjusted under 35 U.S.C. 154(b) by 150 days.

This patent is subject to a terminal disclaimer.

(21) Appl. No.: 12/356,807

(22) Filed: Jan. 21, 2009

(65) Prior Publication Data

US 2010/0027925 A1    Feb. 4, 2010

Related U.S. Application Data

(62) Division of application No. 10/863,869, filed on Jun. 7, 2004, now Pat. No. 7,497,627.

(51) Int. Cl.
*F16C 27/02* (2006.01)
(52) U.S. Cl. ............ 384/105; 384/106; 384/124
(58) Field of Classification Search ......... 384/105, 384/106, 124
See application file for complete search history.

(56) References Cited

U.S. PATENT DOCUMENTS

| | | | |
|---|---|---|---|
| 3,382,014 A | 5/1968 | Marley | |
| 4,871,267 A | 10/1989 | Gu | |
| 5,318,366 A | 6/1994 | Nadjafi | |
| 5,498,082 A | 3/1996 | Nadjafi | |
| 5,529,398 A | 6/1996 | Bosley | |
| 5,871,284 A | 2/1999 | Nadjafi et al. | |
| 5,918,985 A | 7/1999 | Bosley | |
| 5,938,341 A | 8/1999 | Eccles | |
| 6,048,101 A | 4/2000 | Rasmussen | |
| 6,354,741 B1 | 3/2002 | Saville et al. | |
| 2004/0042691 A1 | 3/2004 | Matsunaga | |
| 2004/0066991 A1* | 4/2004 | Agrawal | 384/105 |
| 2004/0096130 A1 | 5/2004 | Saville et al. | |

FOREIGN PATENT DOCUMENTS

DE    2747400 A1    4/1979

OTHER PUBLICATIONS

International Search Report dated Oct. 7, 2005.

* cited by examiner

*Primary Examiner* — William C Joyce
(74) *Attorney, Agent, or Firm* — Robert Desmond, Esq.

(57) ABSTRACT

A hydrodynamic bearing set, for use with a thrust disk disposed between planar surfaces of a housing, includes first and second topfoils disposed adjacent first and second thrust disk axial bearing surfaces and removably secured to the housing. An underspring is secured between each planar housing surface and the corresponding topfoil. Dual-leaf spring pairs attached to at least one topfoil periphery function to urge the topfoils away from the thrust disk axial bearing surfaces by applying a force against a planar housing surface, another topfoil, or a spacer washer secured between adjacent topfoil dual-leaf pairs or frictionally retained within the housing. Alternatively, a wavy washer, a conical spring, a Belleville washer, or a coil spring can be substituted for the dual-leaf spring pairs.

14 Claims, 16 Drawing Sheets

THRUST BEARING

BACKGROUND OF THE INVENTION

The present invention generally relates to the field of hydrodynamic bearings and, more specifically, to an improved compliant foil thrust bearing set providing for a reduced startup torque requirement.

Hydrodynamic bearings are utilized in many types of powered mechanical systems. These bearings are generally placed between two relatively-movable structural components, conventionally referred to as a rotating thrust runner and a stationary housing, where a working fluid is used to prevent dynamic contact between the structural components. The working fluid found in hydrodynamic bearings can be either a liquid such as oil, water, or refrigerants, or a gas such as nitrogen, oxygen, methane, hydrogen, refrigerants, or air. As low viscosity working fluids can be provided for bearing lubrication, hydrodynamic bearings are particularly suitable for applications in which the runner moves relative at a high rate of rotation relative to the housing.

The hydrodynamic bearing may also include one or more foil components in the region between the thrust runner and the bearing housing. The foil components are usually fabricated from a thin sheet of compliant material such as beryllium copper, nickel alloys or stainless steel. Use of the foil material enhances the hydrodynamic characteristics of the hydrodynamic bearing in that deflection of the compliant foil produces desirable hydrodynamic pressure forces between the structural components. It has been demonstrated that such compliant foil components serve to improve bearing function, even under adverse operating conditions.

Unfortunately, the past methods and apparatus for providing hydrodynamic bearing support have disadvantages. To maintain the desired deflection of the compliant foil, the compliant foil hydrodynamic fluid film thrust bearing may include a backing spring to pre-load the compliant foil against one of the structural components. This is exemplified by U.S. Pat. Nos. 5,498,082 and 6,354,741 in which a backing spring is used to hold a foil component in contact against a rotating thrust runner.

In such pre-load configurations, the backing spring provides an axial force which serves to control the deflection of the compliant foil, and helps to establish the converging wedge required to generate the fluid pressure forces, that support the desired thrust load. However, this pre-load force undesirably serves to increase the starting torque of the bearing, where the starting torque should ideally be kept at a low value. Moreover, as the axial pre-load force acts to retain the compliant foil in contact with the thrust disk, there also results an increase in the required thrust disk speed at which the hydrodynamic effects in the wedge channels are strong enough to overcome the pre-load force and force the thrust disk out of physical contact with the top foil. Consequently, such use of a pre-load force results in an increased lift-off/touch-down speed and may increase measurable bearing wear each time the rotating component is started or stopped.

In another configuration, exemplified by U.S. Pat. No. 5,529,398, a spacer is incorporated between two axially-adjacent thrust bearings to provide a space slightly wider than a two-sided thrust disk positioned between the thrust bearings. The spacer is clamped between the adjacent bearings. It can be appreciated by one skilled in the relevant art that if thermal gradients are present in the thrust bearing, this clamping force will result in bearing distortion and bearing performance will be reduced.

As can be seen, there is a need for an improved apparatus and method that provides a hydrodynamic foil bearing with a reduced startup torque requirement.

SUMMARY OF THE INVENTION

In one aspect of the invention, a hydrodynamic bearing set comprises a first topfoil disposed adjacent a first thrust disk axial bearing surface and removably secured to a first planar housing surface; a second topfoil disposed adjacent a second thrust disk axial bearing surface and removably secured to a second planar housing surface; a first underspring removably secured between the first topfoil and the first planar housing surface; and a second underspring removably secured between the second topfoil and the second planar housing surface, where at least the second topfoil includes a plurality of peripheral dual-leaf spring pairs contacting the first planar housing surface to urge the second topfoil away from the thrust disk and thus provide a low torque requirement at start-up of the hydrodynamic bearing set.

In another aspect of the invention, a hydrodynamic bearing set suitable for use in a housing having a first planar surface and a second opposed planar surface, the planar housing surfaces enclosing a thrust disk movable along and rotatable about an axis, the thrust disk having first and second axial bearing surfaces, the hydrodynamic bearing assembly comprising a first topfoil disposed proximate the first axial bearing surface, the first topfoil including a plurality of first topfoil dual-leaf spring pairs contacting the second planar housing surface such that the first topfoil is urged away from the thrust disk, the first topfoil being removably secured to the first planar housing surface; a first spring including a plurality of first spring anti-rotation tabs extending radially from an annular ring, the first spring removably secured between the first topfoil and the first planar housing surface; a second topfoil disposed proximate the second axial bearing surface, the second topfoil including a plurality of second topfoil spring pairs contacting the first planar housing surface such that the second topfoil is urged away from the thrust disk, the second topfoil removably secured to the second planar housing surface, the second spring removably secured between the second topfoil and the second planar housing surface. The second and first topfoil dual-leaf spring pairs may be distributed at the periphery of the bearing pads such that no contact may occur.

In a further aspect of the present invention, a hydrodynamic bearing set suitable for use in a housing having a first planar surface and a second opposed planar surface, the planar housing surfaces enclosing a thrust disk movable along and rotatable about an axis, the thrust disk having first and second axial bearing surfaces, the hydrodynamic bearing assembly comprises a first topfoil disposed proximate the first axial bearing surface, the first topfoil including a plurality of first topfoil planar spring tabs and removably secured to the first planar housing surface; a first spring removably secured between the first topfoil and the first planar housing surface; a second topfoil disposed proximate the second axial bearing surface, the second topfoil including a plurality of second topfoil dual-leaf spring pairs contacting the planar spring tabs such that the first topfoil is urged away from the first thrust disk axial bearing surface and the second topfoil is urged away from the second thrust disk axial bearing surface, the second topfoil removably secured to the second planar housing surface, the second spring removably secured between the second topfoil and the second planar housing surface.

In yet another aspect of the present invention, a hydrodynamic bearing set for use with a thrust disk and opposing housing surfaces includes a washer with an inside diameter larger than an outside diameter of the thrust disk; a first topfoil disposed adjacent to a first thrust disk axial bearing surface and removably secured to a first planar housing surface, where the first topfoil includes a dual-leaf spring in contact with the washer such that the first topfoil is urged away from the thrust disk; a first underspring removably secured between the first topfoil and the first planar housing surface; a second topfoil disposed adjacent to a second thrust disk axial bearing surface and removably secured to the second planar housing surface; and a second underspring removably secured between the second topfoil, the second topfoil including a plurality of second topfoil spring pairs also in contact with the washer so as to urge the second topfoil away from the thrust disk, and the second planar housing surface.

In another aspect of the present invention, a hydrodynamic bearing set includes a first annular ring topfoil disposed adjacent to a first thrust disk axial bearing surface and removably secured to a first planar housing surface; a first underspring removably secured between the first topfoil and the first planar housing surface; a second annular ring topfoil disposed adjacent to a second thrust disk axial bearing surface and removably secured to the second planar housing surface; a second underspring removably secured between the second topfoil and the second planar housing surface; and a wavy spring having a generally annular shape and an inside diameter larger than an outside diameter of the thrust disk, the wavy spring being in contact with both the first annular ring topfoil and the second annular ring topfoil such that the first and second annular ring topfoils are urged away from the first and second thrust disk axial bearing surfaces, respectively.

In a still further aspect of the present invention, a method of providing bearing support with reduced startup torque requirements comprises the steps of securing a first topfoil to a first planar housing surface using a plurality of anchor tabs where the first topfoil is also disposed proximate the first axial bearing surface of a thrust disk; securing a first spring between the first topfoil and a first planar housing surface using a plurality of anti-rotation tabs; providing a plurality of dual-leaf spring pairs on the first topfoil such that the dual-leaf spring pairs contact an outer annular ring of the second topfoil and urge at least the first topfoil away from the thrust disk; securing a second topfoil to a second planar housing surface using a plurality of anchor tabs where the second topfoil is similarly disposed proximate the second axial bearing surface of the thrust disk; and securing a second spring between the second topfoil and a second planar housing surface using a plurality of anti-rotation tabs.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a hydrodynamic bearing enclosing a thrust disk and, more specifically, an improved compliant foil thrust bearing including undersprings and topfoils with peripheral dual-leaf spring pairs. The novel hydrodynamic bearing may be used in a variety of powered rotary equipment including, but not limited to, motor-driven compressors, turbochargers, turbogenerators, air cycle machinery, auxiliary power units, and propulsion engines. The dual-leaf spring pairs thereby provide a preload, positioning the hydrodynamic bearing components against a bearing housing thereby reducing the contact between the hydrodynamic bearing set and the thrust disk. This is unlike the present state of the art in which the bearing is preloaded against the thrust disk or a spacer is provided between support bearings. The hydrodynamic bearing of the present invention also includes anchor tabs on the topfoils and tabs on the springs to removably secure these components to the bearing housing and to keep the components from rotating.

Figure 1:
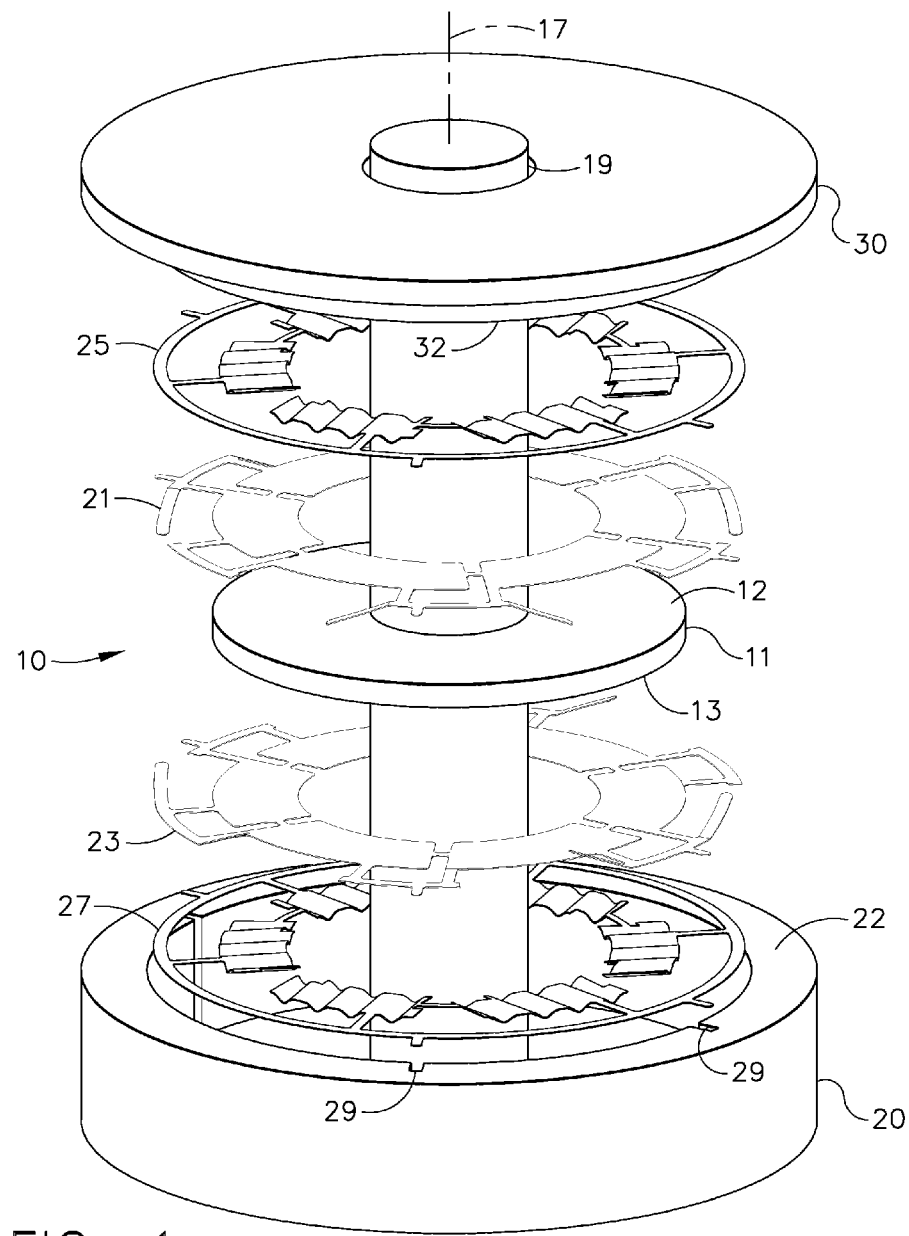
FIG. 1 is an exploded isometric view of a hydrodynamic bearing set including two three-dual-leaf spring topfoils and two undersprings as used with a thrust disk and enclosed in a slotted housing and lid according to an embodiment of the present invention.
Figure 2:
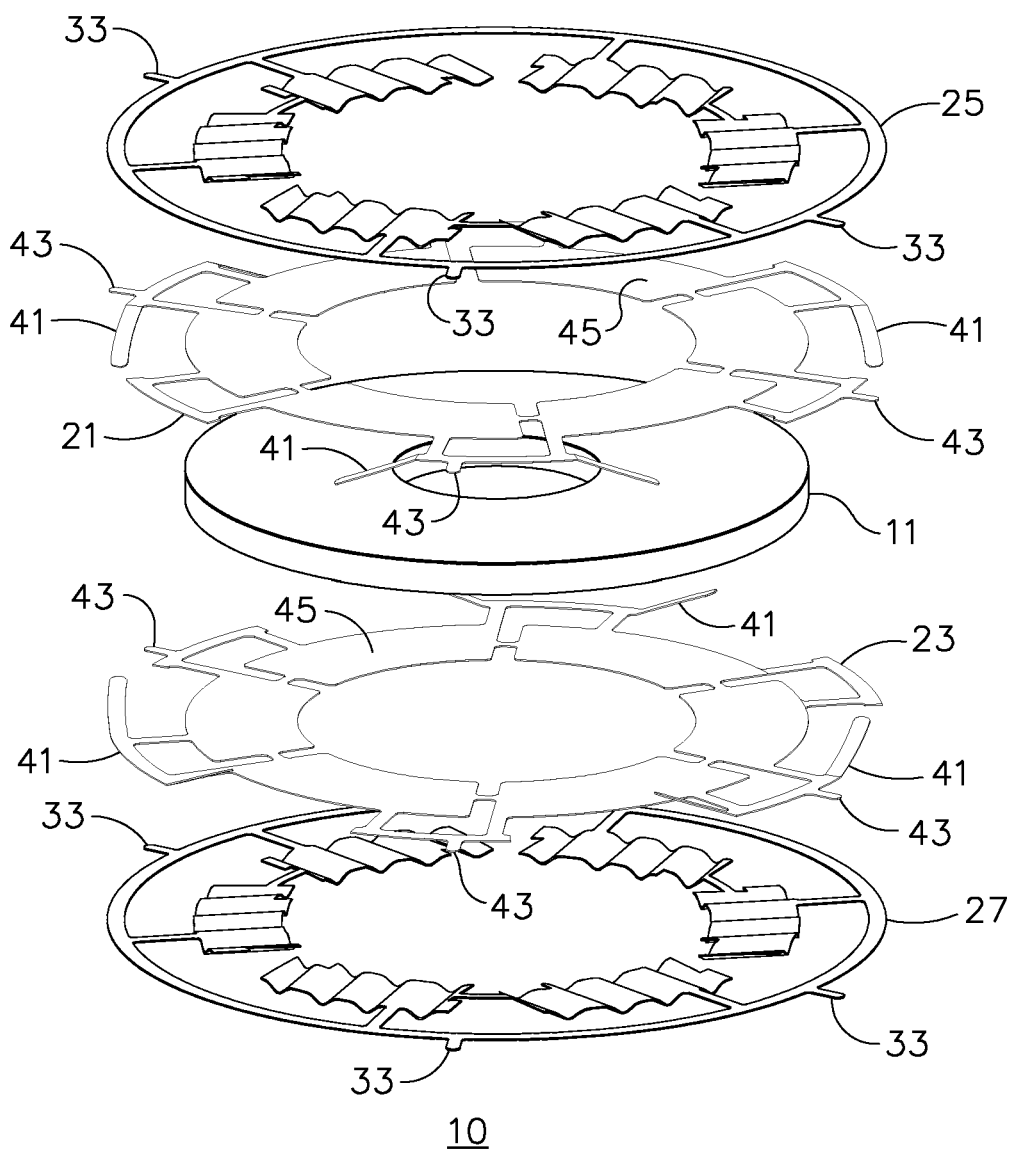
FIG. 2 is a detail exploded isometric view of the hydrodynamic bearing set and thrust disk of FIG. 1 showing component topfoils and undersprings.
Figure 3:
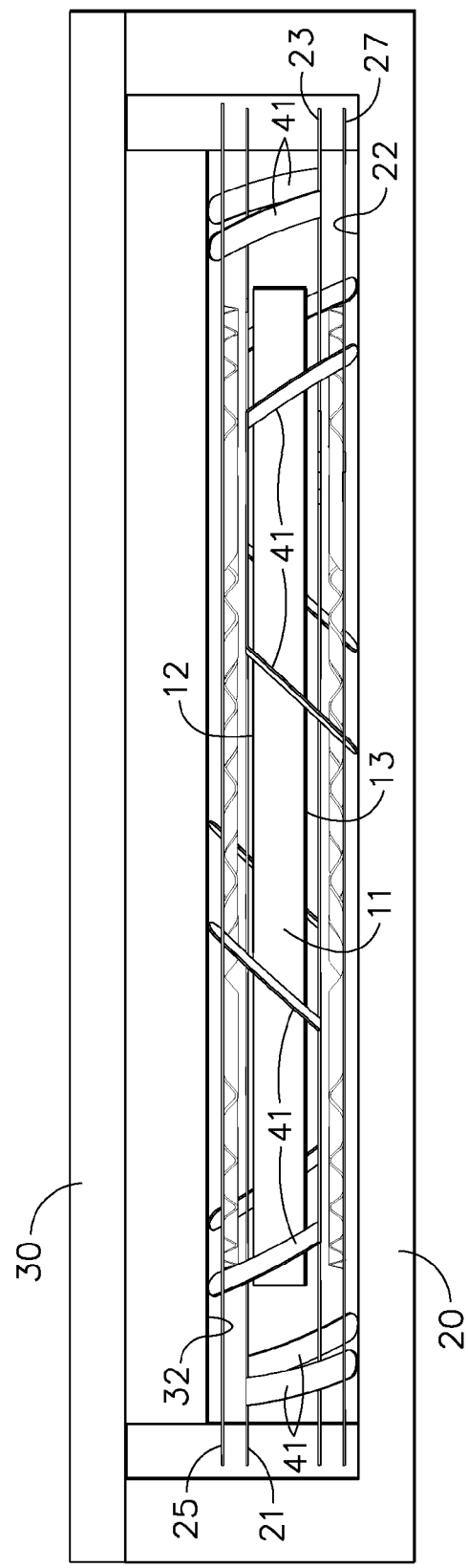
FIG. 3 is an end view of an assembled hydrodynamic bearing set as shown in FIG. 1 with a portion of the housing and lid cut away for clarity of illustration.

In one embodiment of the present invention, shown in the exploded isometric views of FIGS. 1-2 and in the assembled end view of FIG. 3, a hydrodynamic bearing set 10 is used with a thrust disk 11. The thrust disk 11 operates by rotating about a rotational axis 17, as well as by moving along the rotational axis 17. Motive power may be supplied to the thrust disk 11 by a shaft 19 which also rotates about the rotational axis 17. In the configuration shown in FIGS. 1-3, the hydrodynamic bearing set 10 is emplaced between a housing 20 and a lid 30

The thrust disk 11 includes a first axial bearing surface 12 and a second axial bearing surface 13. As can be seen in the end view of FIG. 3, a first topfoil 21 can be positioned adjacent the first axial bearing surface 12 of the thrust disk 11, and a second topfoil 23 can be positioned adjacent the second axial bearing surface 13 of the thrust disk 11. Additionally, a first underspring 25 can be positioned between the first topfoil 21 and a first planar housing surface, here designated as a lid bearing surface 32, and a second underspring 27 can be positioned between the second topfoil 23 and a second planar housing bearing surface 22.

The housing 20 may include a plurality of anchor grooves 29 for retaining the first topfoil 21, the second topfoil 23, the first underspring 25, and the second underspring 27 when the thrust disk 11 is rotating. Located on the periphery of the first topfoil 21 and the second topfoil 23 may be a plurality of anchor tabs 43, where the anchor tabs 43 may have widths smaller than the widths of the anchor grooves 29. Similarly located on the periphery of the first underspring 25 and the second underspring 27 may be a plurality of anchor tabs 33, where the anchor tabs 33 may have widths smaller than the widths of the anchor grooves 29. The anchor tabs 33 and the anchor tabs 43 can be placed into the anchor grooves 29 when the hydrodynamic bearing set 10 is assembled.

The first topfoil 21 may further include a plurality of dual-leaf springs 41 located on the periphery of the first topfoil 21, and two or more bearing pads 45 located inside the periphery of the first topfoil 21, as shown in FIG. 2. When the hydrodynamic bearing set 10 is assembled, as best seen in FIG. 3, the dual-leaf springs 41 attached to the periphery of the first topfoil 21 can push against the housing bearing surface 22. This may urge the first topfoil 21 away from the first axial bearing surface 12 of the thrust disk 11. Likewise, the dual-leaf springs 41 attached to the periphery of the second topfoil 23 can push against the lid bearing surface 32 which may urge the second topfoil 23 away from the second axial bearing surface 13 of the thrust disk 11.

Figure 4:
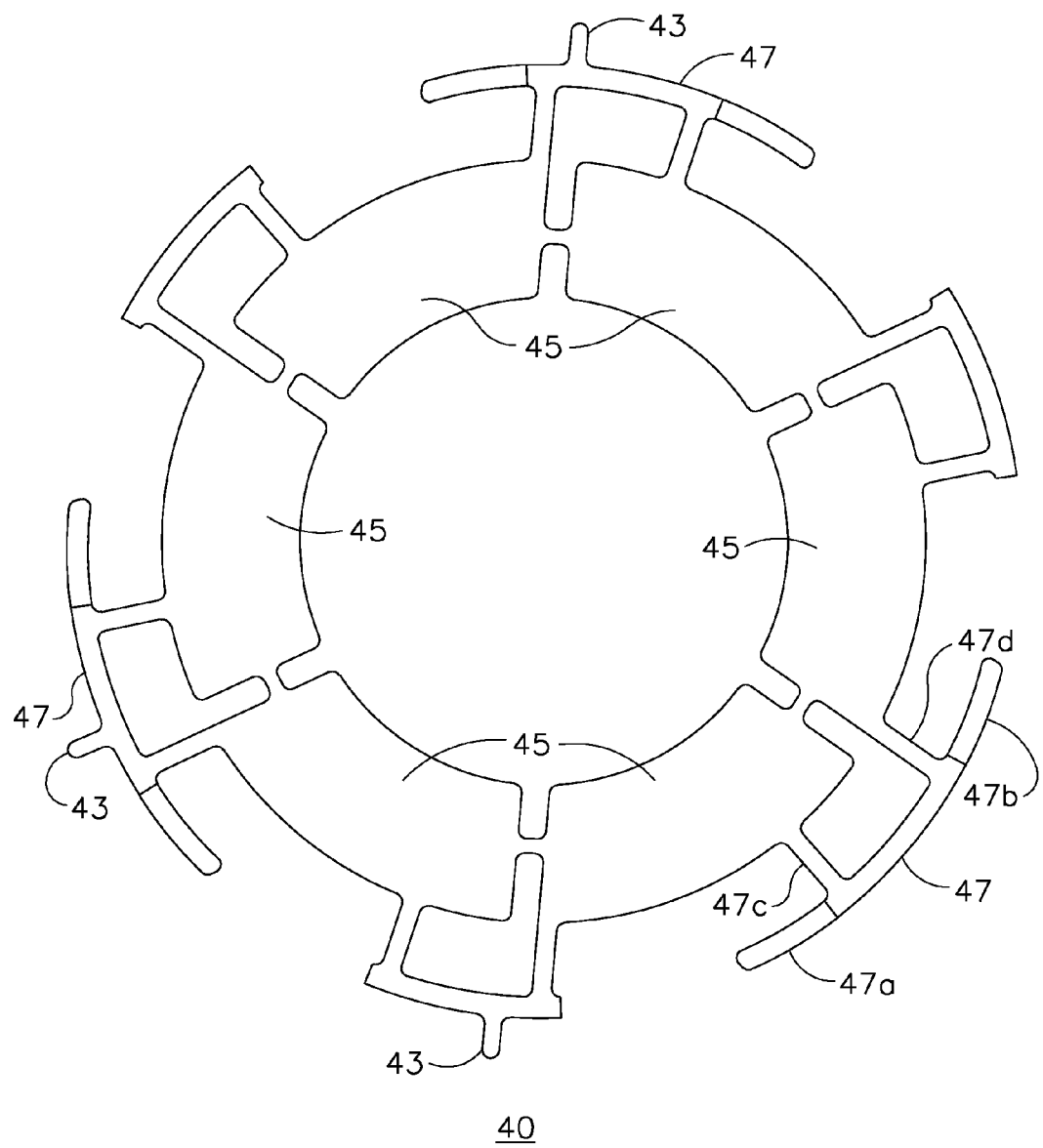
FIG. 4 is a detail plan view of a three-spring topfoil in the hydrodynamic bearing set of FIG. 1.

The first topfoil 21 and the second topfoil 23 may each be formed from a three-spring foil blank 40, shown in FIG. 4. The three-spring foil blank 40 may be fabricated from a thin sheet of beryllium copper, nickel alloy, stainless steel, or other such compliant alloy. The three-spring foil blank 40 may include two or more radial anchor tabs 43, with each anchor tab 43 having a width small enough to fit into a corresponding anchor groove 29 in the housing 20.

The three-spring foil blank 40 may also include three dual-leaf spring forms 47. The dual-leaf spring form 47 may include a pair of a cantilever-style leaf spring arm 47a that may extend from a first radial stem 47c, and a leaf spring arm 47b that may extend from a second radial stem 47d. The leaf spring arms 47a and 47b can be subsequently bent out of the plane defined by the three-spring foil blank 40 to form the dual-leaf spring 41. To form the dual-leaf spring 41, the leaf spring arms 47a and 47b can be bent such that the distance between the plane of the three-spring foil blank 40 and each end of the leaf spring arms 47a and 47b (i.e., the distal tips of the respective leaf stem 47c or 47d), is greater than the spacing between the planar housing bearing surface 22 and the planar lid bearing surface 32 when assembled. This configuration can insure that the dual-leaf spring 41 will be in compression when the hydrodynamic bearing set 10 is installed between the housing 20 and the lid 30 as shown in FIG. 3.

Referring to FIG. 4, each leaf spring arm 47a and 47b of the dual-leaf spring 41 may be symmetric with respect to a plane through a radial line, that passes through the center of the dual-leaf spring form 47 extending between the radial stems 47c and 47d and a line parallel to the rotational axis 17, in FIG. 1. The length of the dual leaf spring 47a may be different from the length of the dual leaf spring 47b. That is, the dual leaf spring pair 47a and 47b may be unsymmetric with respect to a radial line passing through the center of the dual-leaf spring form 47. In addition, the three-spring foil blank 40 may include two or more bearing pads 45, where two adjacent bearing pads 45 may both be connected to the same dual-leaf spring form 47. The total pre-load force range produced by all of the dual-leaf springs 41 from the first topfoil 21 may exert about 0.1 psi to 10 psi pressure over the area of contact between the first topfoil 21 and the planar lid bearing surface 32. It should be understood that the above force range is determined by the total area of the first topfoil 21 projected onto the thrust disk 11.

Figure 5:
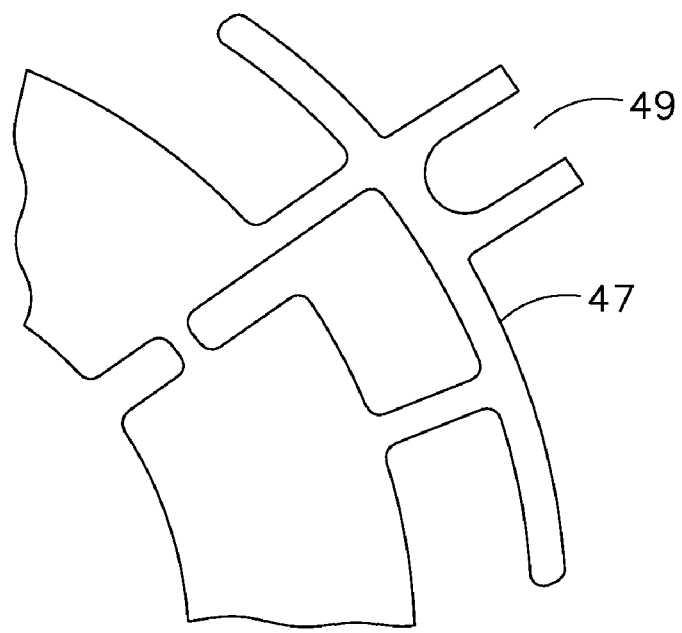
FIG. 5 is a detail view of an alternate embodiment of a spring tab as may be used in a hydrodynamic bearing topfoil of the present invention and an alternate embodiment of an anti-rotation feature with an anchoring groove secured by a pin.

In another embodiment, the first topfoil 21 and the second topfoil 23 may be retained in the housing 20 by means of a pin (not shown) provided on the housing 20 and passing through a slot 49 provided adjacent the dual-leaf spring form 47, as shown in FIG. 5.

Figure 6:
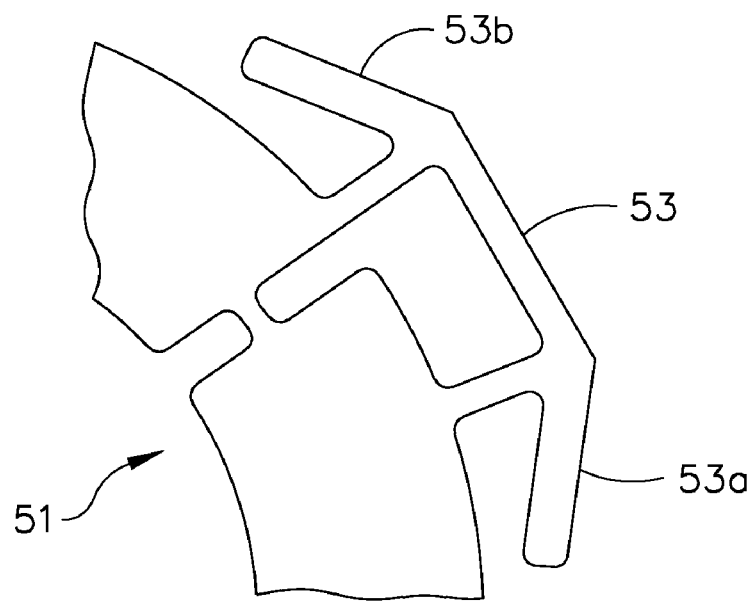
FIG. 6 is a detail view of an alternate embodiment of a spring tab having an obtuse configuration as may be used in a hydrodynamic bearing topfoil of the present invention.

In yet another embodiment, a topfoil 51 may include one or more obtuse spring forms 53 having straight tabs 53a and 53b forming an obtuse angle, as shown in FIG. 6. The straight tabs 53a and 53b can be bent out of the plane of the topfoil 51 to provide a spring action to urge the topfoil away from the housing bearing surface 22 or from the lid bearing surface 32, as described above.

Figure 7:
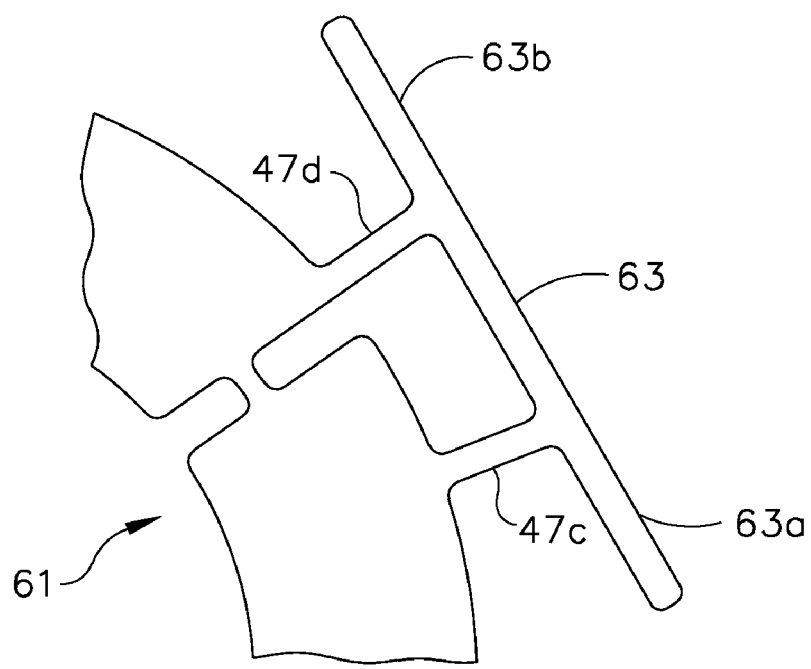
FIG. 7 is a detail view of an alternate embodiment of a spring tab having a straight configuration as may be used in a hydrodynamic bearing topfoil of the present invention.

In another embodiment, shown in FIG. 7, a topfoil 61 may include a straight spring form 63 having tabs 63a and 63b. The tabs 63a and 63b may be bent out of the plane of the topfoil 61 to form two leaf spring arms (not shown) extending at right angles to the respective radial stems 47c and 47d so as to provide the desired spring action.

Figure 8:
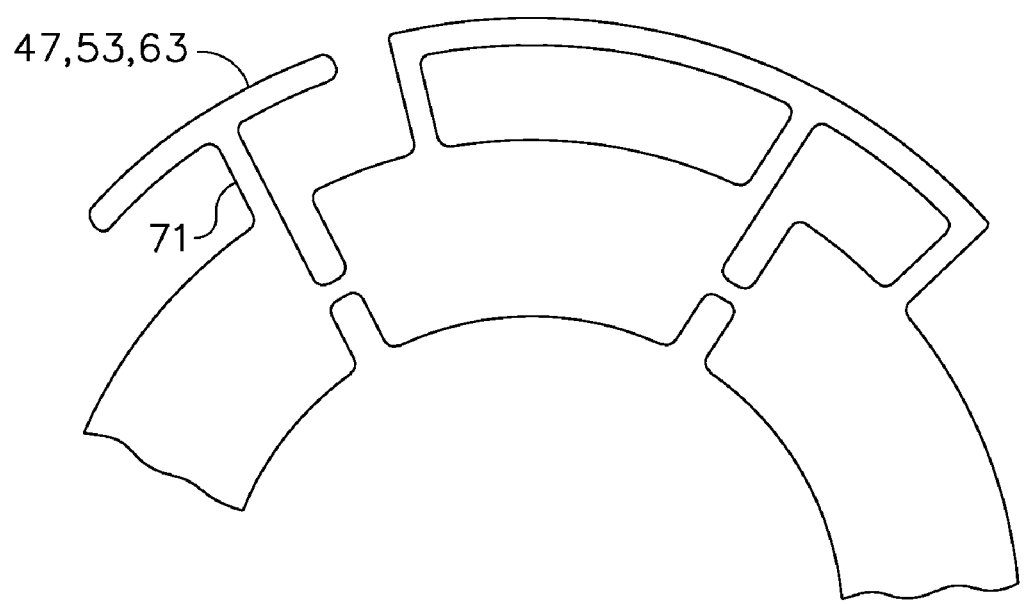
FIG. 8 is a detail view of an alternate embodiment of a spring tab having a single leaf stem according to the present invention.

In still another embodiment, the arc-shaped spring form 47, the obtuse spring form 53 (not shown), or the straight spring form 63 (not shown) may be attached to the respective topfoil by a single leaf stem 71, as shown in FIG. 8.

Figure 9:
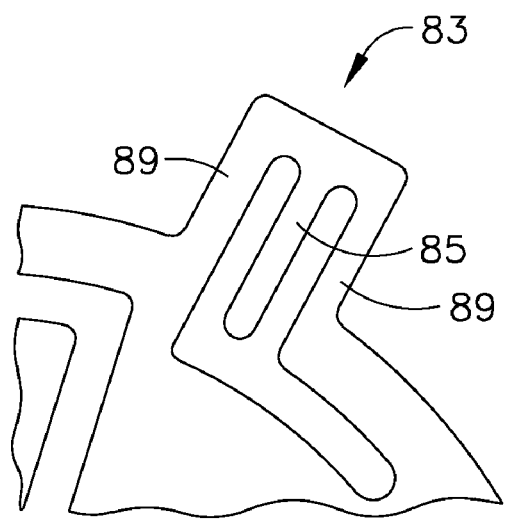
FIG. 9 is a detail view of an alternate embodiment of a spring tab having radially-inward tab sections as may be used in a hydrodynamic bearing topfoil of the present invention.

FIG. 9 illustrates a topfoil 81 having a radial spring tab 83. The radial spring tab 83 may include a radial spring arm 85 attached to the topfoil 81 by two radial stems 89 or, alternatively (not shown), by one radial stem 89.

Figure 10:
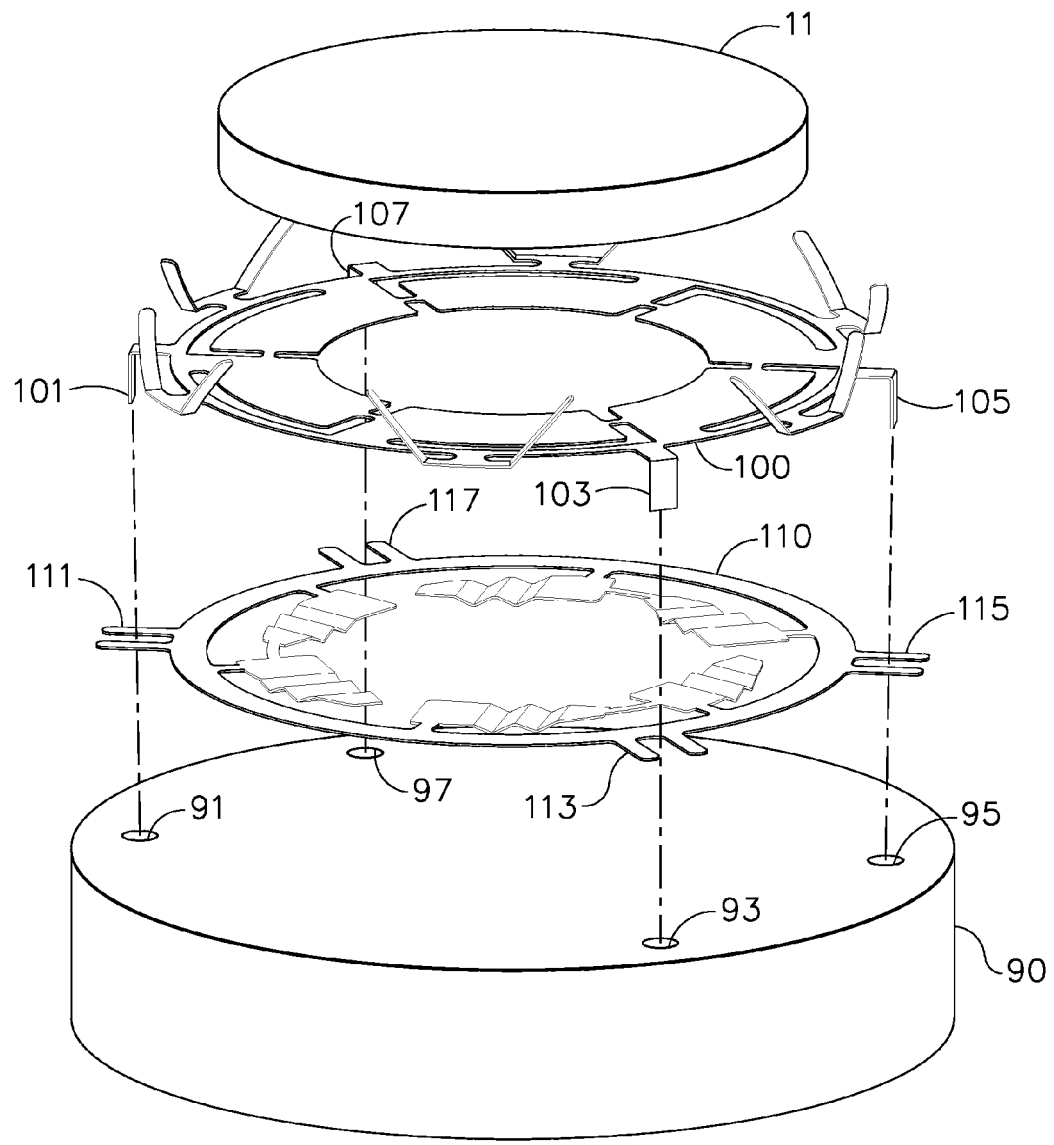
FIG. 10 is alternate embodiment of the topfoils and undersprings of the hydrodynamic bearing set of FIG. 1 including a plurality of anchor tabs bent normal on the topfoils for mating with positioning holes in an alternative housing unit, according to an embodiment of the present invention.

It can be appreciated by one skilled in the relevant art that any of the arc-shaped spring form 47, the obtuse spring form 53, the straight spring form 63, or the radial spring tab 83 can be used in a configuration which requires the spring tab to i) push against an opposed housing bearing surface or lid bearing surface, ii) push against an opposed topfoil which has either matching spring tabs or no spring tabs (described below), or iii) push against a washer disposed between two topfoils with spring tabs (described below). In an alternative embodiment, shown in the exploded isometric view of FIG. 10, a topfoil 100 may include a plurality of anchor tabs 101, 103, 105, and 107 bent normal (i.e., approximately 90°) to the topfoil 100 for mating with a respective plurality of positioning holes 91, 93, 95, and 97 in a lower housing unit 90. The topfoil 100 may be disposed between the lower housing unit 90 and the thrust disk 11. An underspring 110, disposed between the topfoil 100 and the lower housing unit 90, may include a plurality of anti-rotation tab-pairs 111, 113, 115, and 117 for engagement with the anchor tabs 101, 103, 105, and 107.

Figure 11:
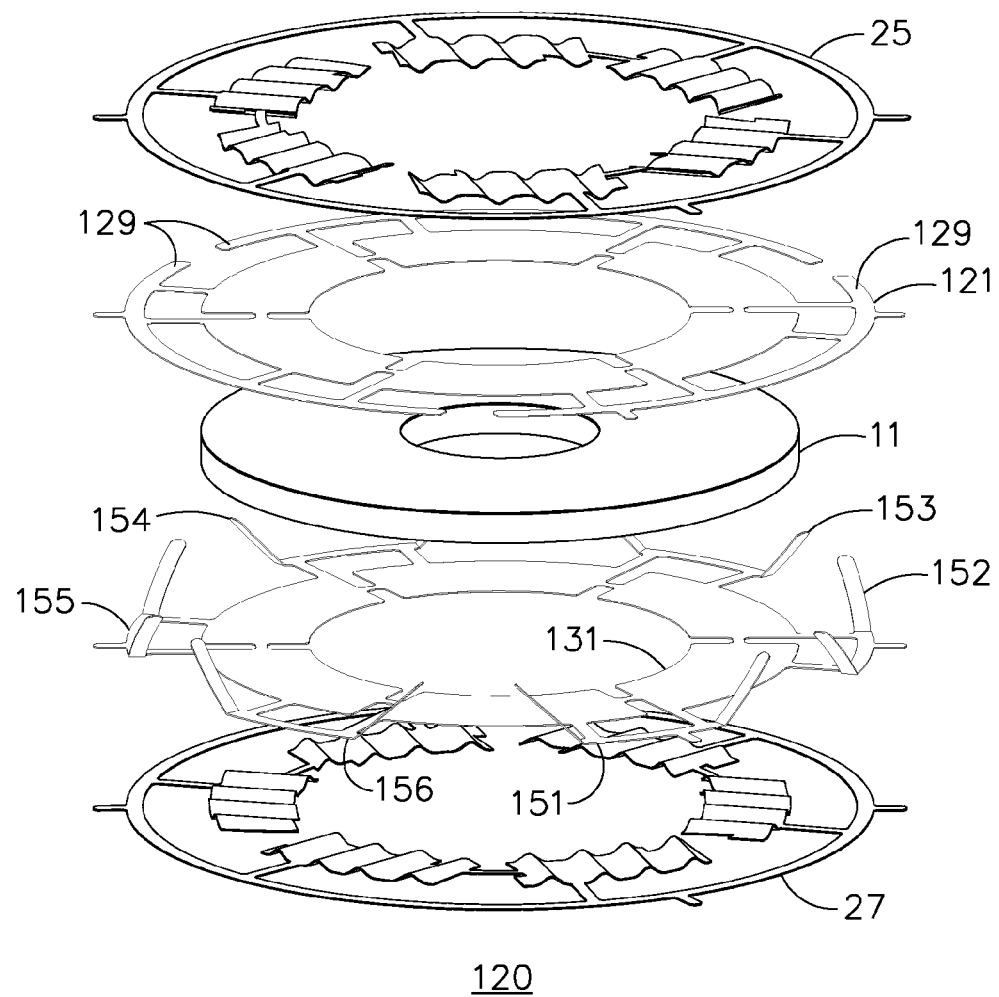
FIG. 11 is an exploded isometric view of a hydrodynamic bearing set including a broken annular ring topfoil, a topfoil having six dual-leaf spring tabs, and two undersprings as used with a thrust disk according to an embodiment of the present invention.

In another embodiment, shown in the exploded isometric view of FIG. 11, a hydrodynamic bearing set 120 is used with the thrust disk 11. Under typical operating conditions, the hydrodynamic bearing set 120 can be emplaced between the housing 20 and the lid 30 (shown in FIG. 1). The hydrodynamic bearing set 120 includes the first underspring 25, a three-tab topfoil 121, a three-tab six-spring topfoil 131, and the second underspring 27.

Figure 12:
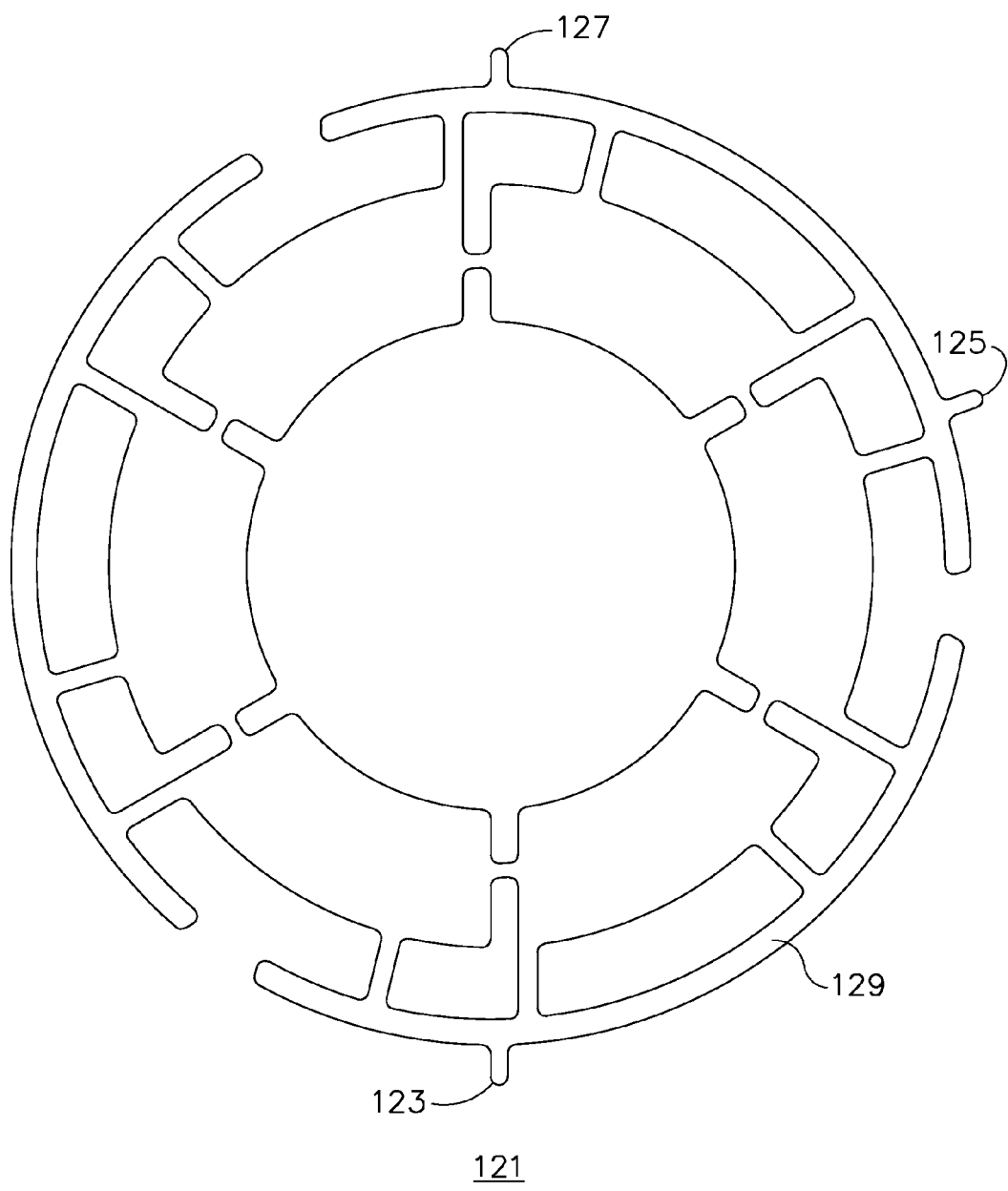
FIG. 12 is a plan view of the broken annular ring topfoil in the thrust bearing set of FIG. 11.

The three-tab topfoil 121 is shown in FIG. 12. The three-tab topfoil 121 is similar to the topfoil blank 40 (above) except for differences as described below. The three-tab topfoil 121 may include three anchor tab arms 123, 125, and 127. The three-tab topfoil 121 may also include a broken annular ring 129 comprising a plurality of planar spring tabs.

Figure 13:
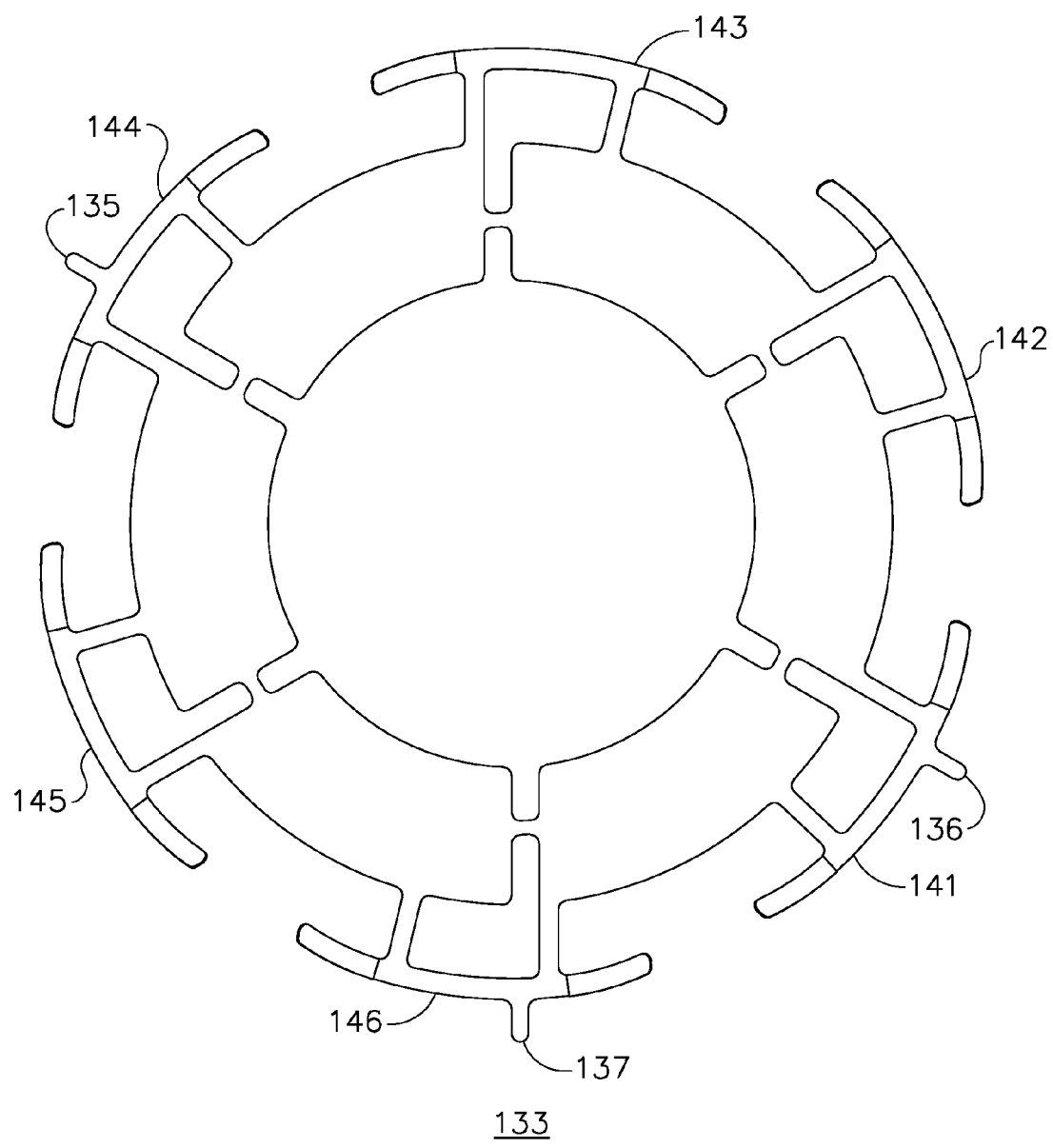
FIG. 13 is a plan view of a six dual-leaf spring topfoil blank used in forming a topfoil in the thrust bearing set of FIG. 11.

The three-tab six-spring topfoil 131 can be formed from a topfoil blank 133, shown in FIG. 13. The topfoil blank 133 is similar to the topfoil blank 40 (above) except for differences as described below. The topfoil blank 133 may include three anchor tabs 135, 136, and 137. Alternatively, the three-tab six-spring topfoil 131 may include a minimum of two anchor tabs, such as the anchor tabs 135 and 137, for example. The topfoil blank 133 may also include six leaf spring tabs 141, 142, 143, 144, 145, and 146. The leaf spring tab 141, for example, can be bent out of the plane defined by the topfoil blank 133 to form a dual-leaf spring pair 151 on the three-tab six-spring topfoil 131, shown in FIG. 11. The other leaf spring tabs 142, 143, 144, 145, and 146 can be similarly bent to form dual-leaf spring pairs 152, 153, 154, 155, and 156 respectively on the three-tab six-spring topfoil 131.

Figure 14:
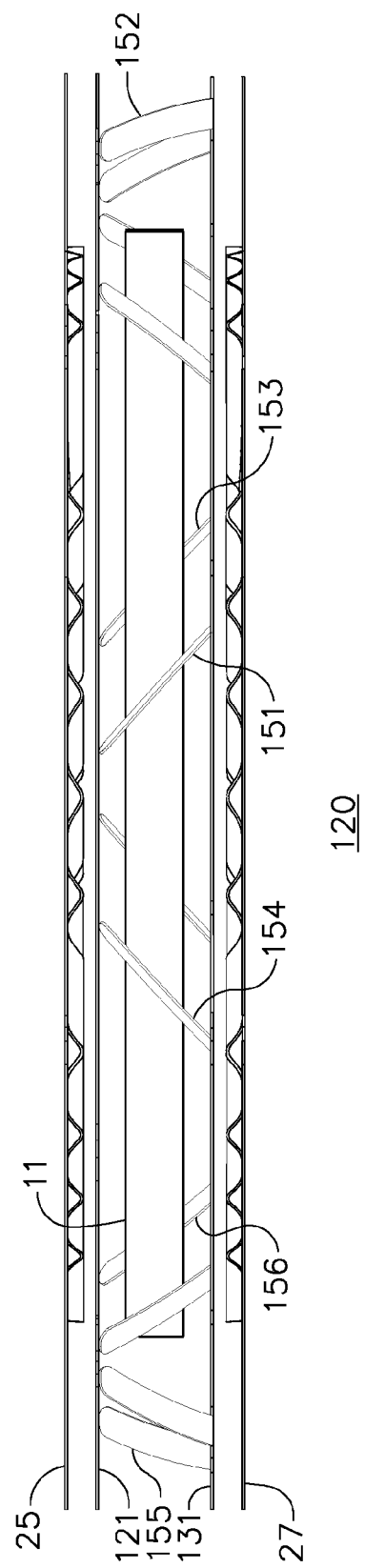
FIG. 14 is an end view of the hydrodynamic bearing set and thrust disk of FIG. 11 as assembled within a housing assembly.

When the hydrodynamic bearing set 120 is assembled, as shown in the side view of FIG. 14, the dual-leaf spring pairs 152, 153, 154, 155, and 156 bear against the broken annular ring 129 of the three-tab topfoil 121.

Figure 15:
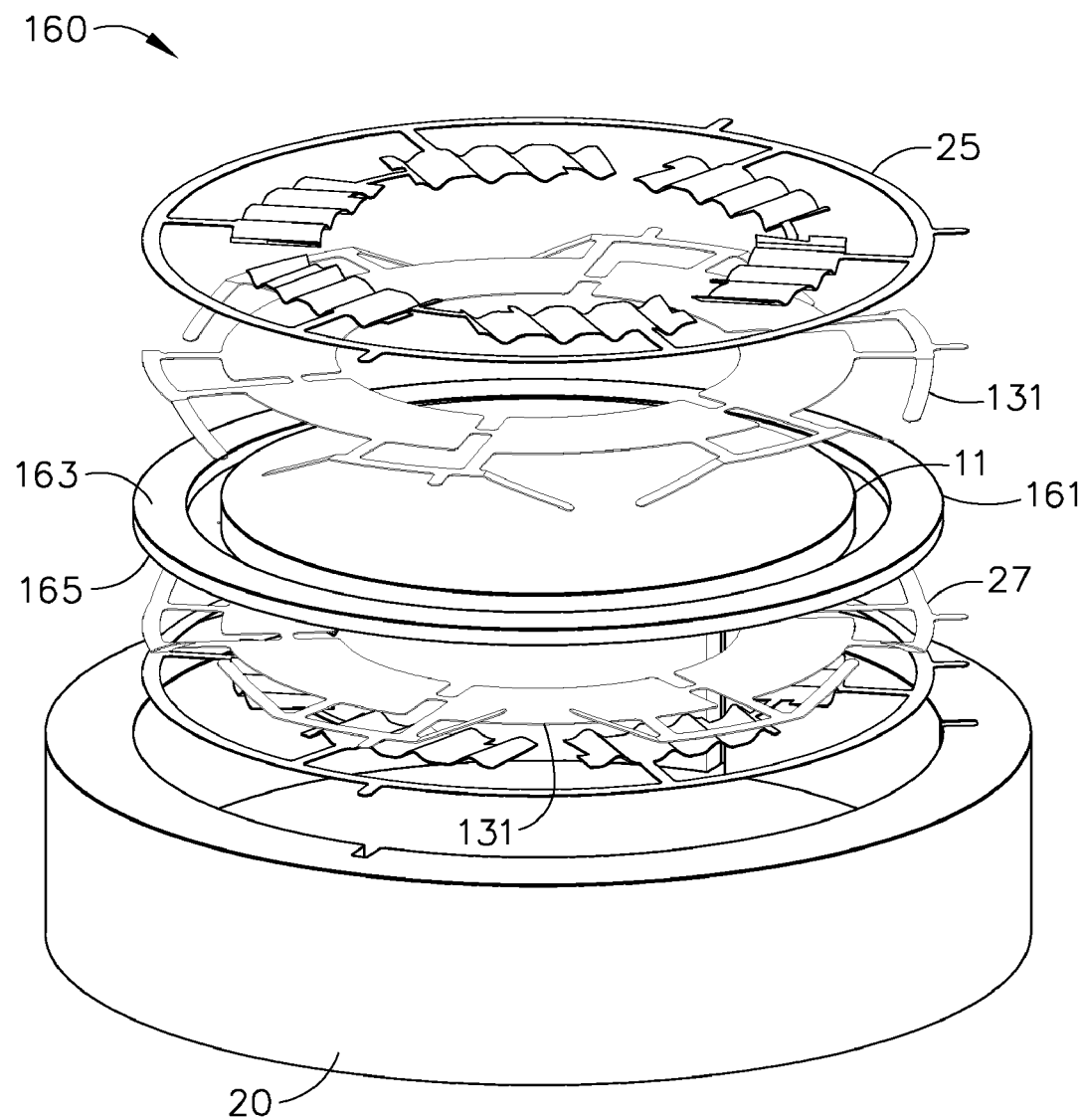
FIG. 15 is an exploded isometric view of a hydrodynamic bearing set including two topfoils with dual-leaf spring tabs, a spacer washer, and two undersprings as used with a thrust disk according to another embodiment of the present invention.

In still another embodiment, shown in the exploded isometric view of FIG. 15, a hydrodynamic bearing set 160 is used with the thrust disk 11. Under typical operating conditions, the hydrodynamic bearing set 160 can be emplaced between the housing 20 and the lid 30 (not shown). The hydrodynamic bearing set 160 may include the first underspring 25, the first three-tab six-spring topfoil 131, the washer 161, a second three-tab six-spring topfoil 131, and the second underspring 27. The inside diameter of the washer 161 may be larger than the outside diameter of the thrust disk 11.

Figure 16:
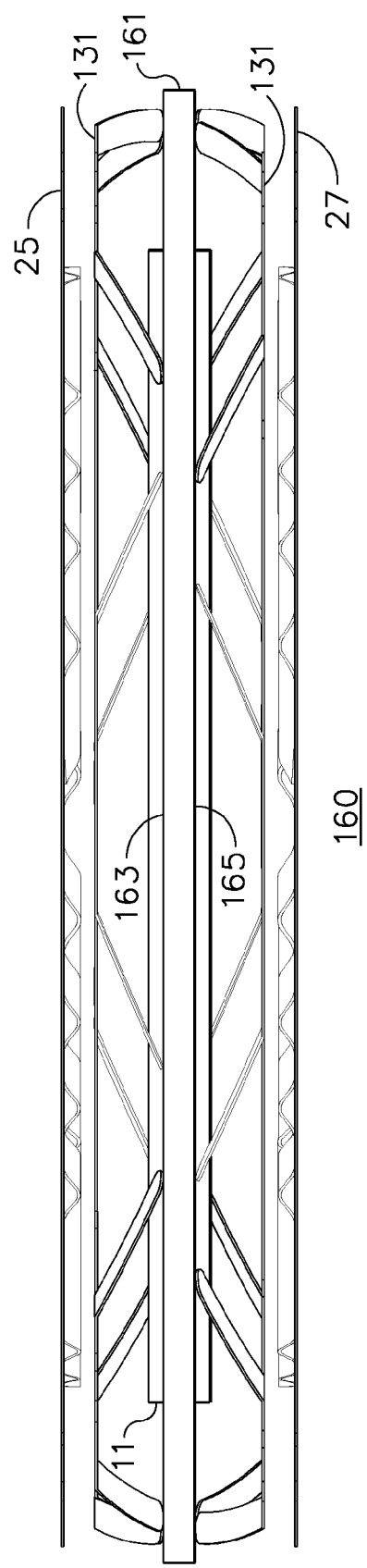
FIG. 16 is an end view of the hydrodynamic bearing set and thrust disk of FIG. 15 as assembled within a housing assembly.

When the hydrodynamic bearing set 160 is assembled, as shown in the side view of FIG. 16, the first three-tab six-spring topfoil 131 can bear against an upper surface 163 of the washer 161, and the second three-tab six-spring topfoil 131 can bear against a lower surface 165 of the washer 161. Alternatively, the outside diameter of the washer 161 may closely match the inside diameter of the housing bearing surface 22 (shown in FIG. 1) to provide a press fit whereby the washer 161 can be frictionally retained against the housing bearing surface 22. In an alternative embodiment (not shown), the washer 161 may include radially-inward cantilever springs to preload the topfoils 131 against the housing 20 and the cover 30, respectively.

Figure 17:
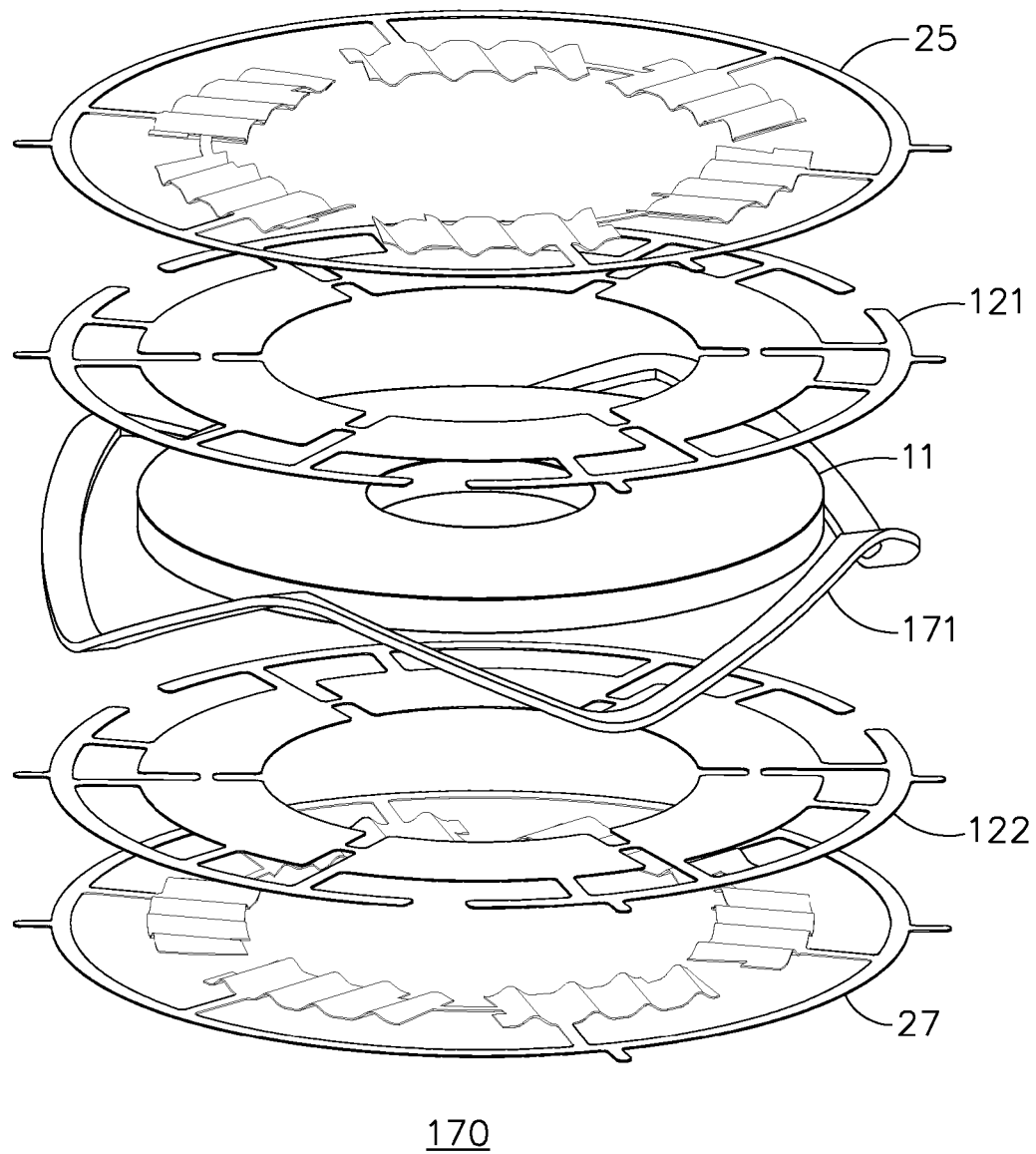
FIG. 17 is an exploded isometric view of another embodiment of a hydrodynamic bearing set including two broken annular ring topfoils, a wavy spring, and two undersprings as used with a thrust disk according to the present invention.

In yet another embodiment, shown in the exploded isometric view of FIG. 17, a hydrodynamic bearing set 170 is used with the thrust disk 11. Under typical operating conditions, the hydrodynamic bearing set 170 can be emplaced between the housing 20 (not shown) and the lid 30 (not shown). The hydrodynamic bearing set 170 may include the first underspring 25, the first three-tab topfoil 121, a separation spring such as a wavy or undulating washer 171, a second three-tab topfoil 122, and the second underspring 27. The wavy washer 171 may be generally annular in shape with an inside diameter larger than the outside diameter of the thrust disk 11.

Figure 18:
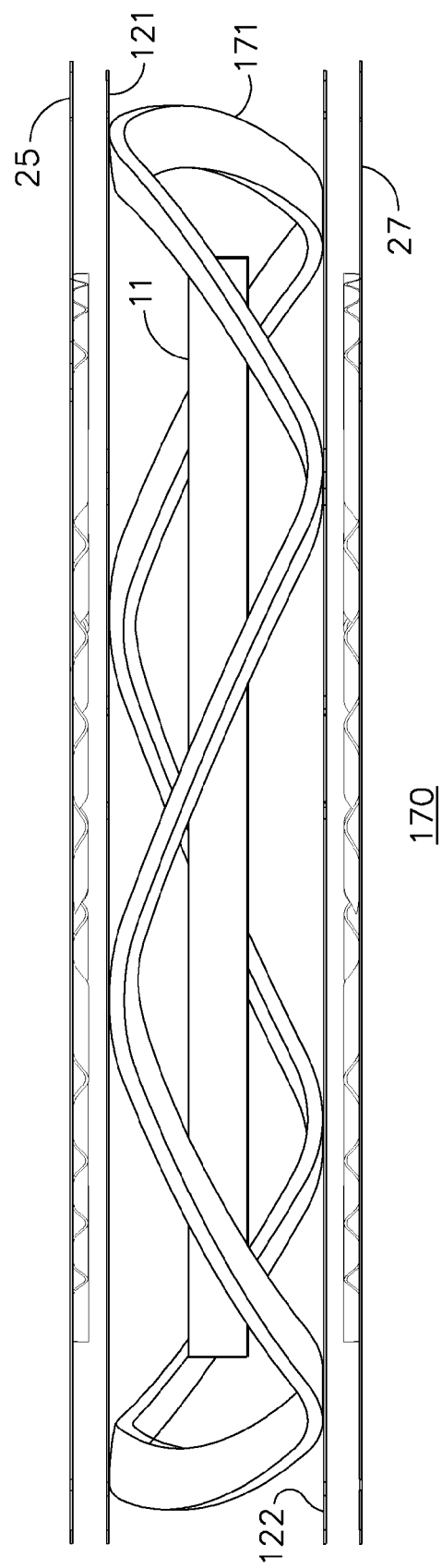
FIG. 18 is an end view of the hydrodynamic bearing set and thrust disk of FIG. 17 as assembled within a housing assembly.

When the hydrodynamic bearing set 170 is assembled, as shown in the side view of FIG. 18, the wavy washer 171 can bear against both the first three-tab topfoil 121 and the second three-tab topfoil 122. It can be appreciated by one skilled in the relevant art that one or two Belleville washers, or conical springs, can be used as the separation spring in place of the wavy washer 171. In an alternative embodiment (not shown) the hydrodynamic bearing set 170 may include, in place of the wavy washer 171, a large coil spring as the separation spring enclosing the thrust disk 11. In yet another alternative embodiment (not shown), two or more small coil springs enclosing the thrust disk 11 may be used as a separation spring in place of the wavy washer 171.

It should be understood, of course, that the foregoing relates to exemplary embodiments of the invention and that modifications may be made without departing from the spirit and scope of the invention as set forth in the following claims.

We claim:

1. A hydrodynamic bearing set suitable for use in a housing having a first planar surface and a second opposed planar surface, the planar housing surfaces enclosing a thrust disk movable along and rotatable about an axis, the thrust disk having first and second axial bearing surfaces, said hydrodynamic bearing set comprising
a first topfoil disposed adjacent the first axial bearing surface and removably secured to the housing, said first topfoil including a first topfoil spring operatively contacting the second planar housing surface such that said first topfoil is urged away from the thrust disk;
a first underspring removably secured between said first topfoil and the first planar housing surface;
a second topfoil disposed adjacent the second axial bearing surface and removably secured to the housing; and
a second underspring removably secured between said second topfoil and the second planar housing surface.

2. The hydrodynamic bearing set of claim 1, wherein said first topfoil spring comprises at least one dual-leaf spring attached to a periphery of said first topfoil, and said dual-leaf spring includes two leaf spring arms.

3. The hydrodynamic bearing set of claim 2, wherein said two leaf spring arms extend from at least one radial stem to form an arc shape, said two leaf spring arms further connected to said first topfoil periphery via said at least one radial stem.

4. The hydrodynamic bearing set of claim 2, wherein said two leaf spring arms extend at right angles to at least one radial stem to form a straight shape, said two leaf spring arms further connected to said first topfoil periphery via said at least one radial stem.

5. The hydrodynamic bearing set of claim 2, wherein said two leaf spring arms extend from at least one radial stem to form an obtuse angle, said two leaf spring arms further connected to said first topfoil periphery via said at least one radial stem.

6. The hydrodynamic bearing set of claim 1 wherein said first topfoil spring comprises at least one radial spring arm.

7. The hydrodynamic bearing set of claim 1, wherein said first topfoil further comprises a plurality of anchor tabs disposed on an outside circumference of said topfoil, each said anchor tab connected to said topfoil by at least one of a bearing pad or a radial stem.

8. The hydrodynamic bearing set of claim 7, wherein at least one said anchor tab extends normal to a plane defined by said first topfoil.

9. The hydrodynamic bearing set of claim 7, wherein at least one said anchor tab is configured for placement into a housing groove.

10. The hydrodynamic bearing set of claim 1, wherein said first topfoil further comprises at least two bearing pads.

11. The hydrodynamic bearing set of claim 1, wherein said first underspring comprises a plurality of spring pads.

12. The hydrodynamic bearing set of claim 11, wherein said spring pads lie inside an imaginary circle having a diameter approximately the same as a diameter of the thrust disk.

13. The hydrodynamic bearing set of claim 1, wherein said first underspring comprises a plurality of U-shaped anti-rotation tabs.

14. The hydrodynamic bearing set of claim 1, wherein said second topfoil comprises a second topfoil spring operatively contacting the first planar housing surface such that said second topfoil is urged away from the thrust disk.

* * * * *